July 13, 1926.
H. C. BREWSTER
SPINDLE DRIVER
Filed Nov. 2, 1923
1,592,133
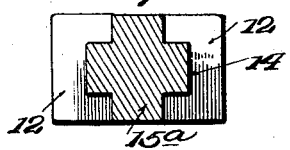
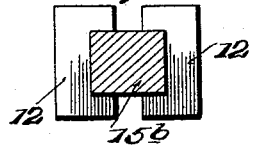
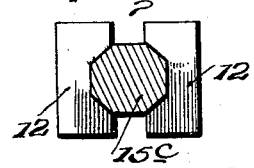
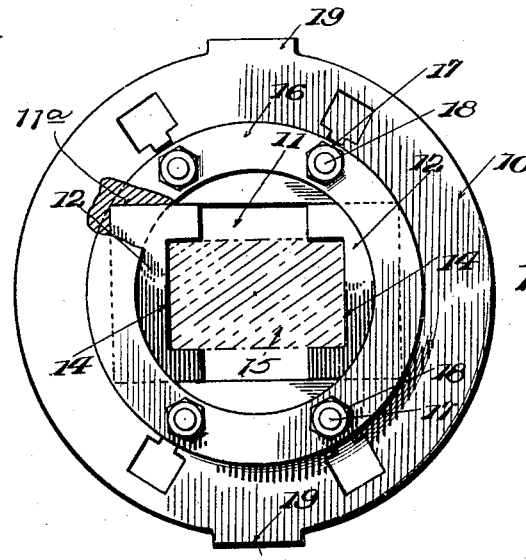
WITNESSES
INVENTOR
H. C. Brewster
BY
ATTORNEYS Patented July 13, 1926.

1,592,133

UNITED STATES PATENT OFFICE.

HARRY C. BREWSTER, OF SHREVEPORT, LOUISIANA.

SPINDLE DRIVER.

Application filed November 2, 1923. Serial No. 672,452.

This invention relates to improvements in spindle drivers, by changing keys or wedges to fit any spindle shaft, square, octagon, fluted or other non-circular shape.

The invention more particularly relates to a device which may be utilized for driving a spindle or shaft and has for its object to provide a spindle of this character which will positively retain a spindle or shaft to rotate therewith and at the same time permit free longitudinal movement of the spindle or shaft, using any non-circular or angular shape spindle, fluted, octagon, square, or otherwise.

It is also an important object of the invention that the holder be of such construction that the parts subjected to wear by the associated spindle or shaft be renewable and thereby to enable new wearing surfaces to be provided.

Other objects, and objects relating to details of construction, combination and arrangement of parts will hereinafter appear in the detailed description to follow.

The invention is illustrated by way of example in the accompanying drawings, in which:—

Figure 1 is an end view with part in section of a holder embodying the present invention, Figure 2 is a perspective view of the same with parts broken away and shown in section in order to more clearly illustrate the holder, Figure 3 is a longitudinal sectional view of one of the retaining keys employed in the construction of the holder, Figure 4 is a sectional plan view of a modified form of the shaft or spindle in a fluted shape, Figure 5 is a view similar to Figure 4 showing the shaft or spindle square shaped in cross-section, and Figure 6 is a similar view showing a hexagonal shaped shaft, with the grooves in the keys shaped to conform thereto.

Referring to the drawings more particularly, 10 indicates generally a body member which is cylindrical and slightly tapered toward one end as shown. This body member is provided with a central longitudinally extending bore 11 formed of a pair of diametrically opposed rectangular grooves, said grooves being arranged longitudinally of the body member 10 and each groove being adapted to receive a key member 12. The floor of the grooves accommodating the keys 12 slightly converge toward the tapered end of the body member 10 and each key 12 has its outer face inclined, as at 13, Figure 3. Each key 12 is in fact substantially in the form of a grooved wedge and is self-seating. Each wedge 12 has its inner surface provided with a longitudinally extending groove 14, said grooves being arranged directly opposite each other and being adapted to receive and loosely hold a shaft or spindle or a tool shank, as shown in dotted lines at 15. It is to be understood that the grooves 14 might be made of any shape desired; that is, of such a shape whereby to permit longitudinal sliding movement of any shaped shaft or spindle 15. It is further obvious that a greater number of the keys 12 might be employed if so desired. Upon the top or end of face of the body member 10 there is placed a ring 16 which is adapted to fit over and upon the associated ends of the keys 12. The ring should be of such construction that the same will not interfere with the free longitudinal and rotary movement of the shaft or spindle 15. Suitable threaded studs 17 are formed upon the upper end of the body member 10 and extend through openings in the ring 16, and upon each stud there is screwed a nut 18, whereby to clamp the ring 16 in applied position. The body member 10 may also be formed upon its exterior peripheral surface with any number of longitudinal ribs 19 and thus to permit this body member to be inserted and held non-rotatably in a hub or chuck employed for rotating the member 10. It is believed from the foregoing description that the use of the present device can be clearly understood. The particular advantages arising from a device of this character is that the same can be efficiently employed as a means for imparting rotary motion to a spindle, shank or shaft and at the same time permit the spindle or shaft to move freely longitudinally. It is also important to note that the keys 12 can be easily removed by removing the nuts 18 and the ring 16. A number of these keys could be kept in stock and substituted whenever necessary; that is, whenever a key was worn to such an extent that the same would not maintain the associated shaft or spindle in its proper alignment.

In Figures 4, 5, and 6 I have illustrated several popular shapes of the shank shaft or spindle, Figure 4 showing a shaft 15ª cruciform shaped in cross section; Figure 5 showing a rectangular shaped shaft 15ᵇ; and Figure 6 disclosing a hexagonal shaft 15ᶜ. It should be understood that the keys 12 are provided with grooves shaped to conform to a particular style of shaft as may be necessary.

While I have shown and described the preferred form of my invention, I wish it to be understood that I am aware of the fact that the construction, combination and arrangement of parts may be changed by those skilled in the art without departing from the spirit of the invention, as indicated by the appended claims.

Having thus described the invention, what I claim is:

1. A spindle driver comprising in combination a hollow body member having a vertical longitudinal bore provided with opposing longitudinal angular channels, means carried on the periphery of said body member whereby to impart rotary motion thereto, opposing self seating keys removably held in said channels, said keys having longitudinal angular grooves in their opposing faces, and a spindle of angular cross-section loosely held between said keys and independently thereof and of the body member, whereby said spindle is so held against relative rotary motion with respect to the body member as to permit independent longitudinal sliding movement of the spindle.

2. A spindle driver, comprising a hollow body member, means on the periphery of said body whereby to impart rotary motion to the same, said member provided with a pair of opposing longitudinally extending angular grooves in the inner periphery thereof, said grooves tapering toward one end of said body member, opposing key members fitted in said grooves, each key member having a longitudinal channel in its inner face, said channels being adapted to loosely receive a spindle or shank of angular cross section whereby to hold said shank against relative turning movement with respect to the body member and the key members, but to permit free longitudinal sliding movement of said shank simultaneously with the rotary movement of the body member.

3. A spindle driver as defined in claim 1, characterized by a key retaining ring removably mounted on the top of the body member.

HARRY C. BREWSTER.